though the floor of the strainer and the above mentioned corner thereof for striking and impacting the pulp repeatedly to insure the maximum extraction of the juice and to move the pulp substantially continuously in a circular path towards the point of discharge.

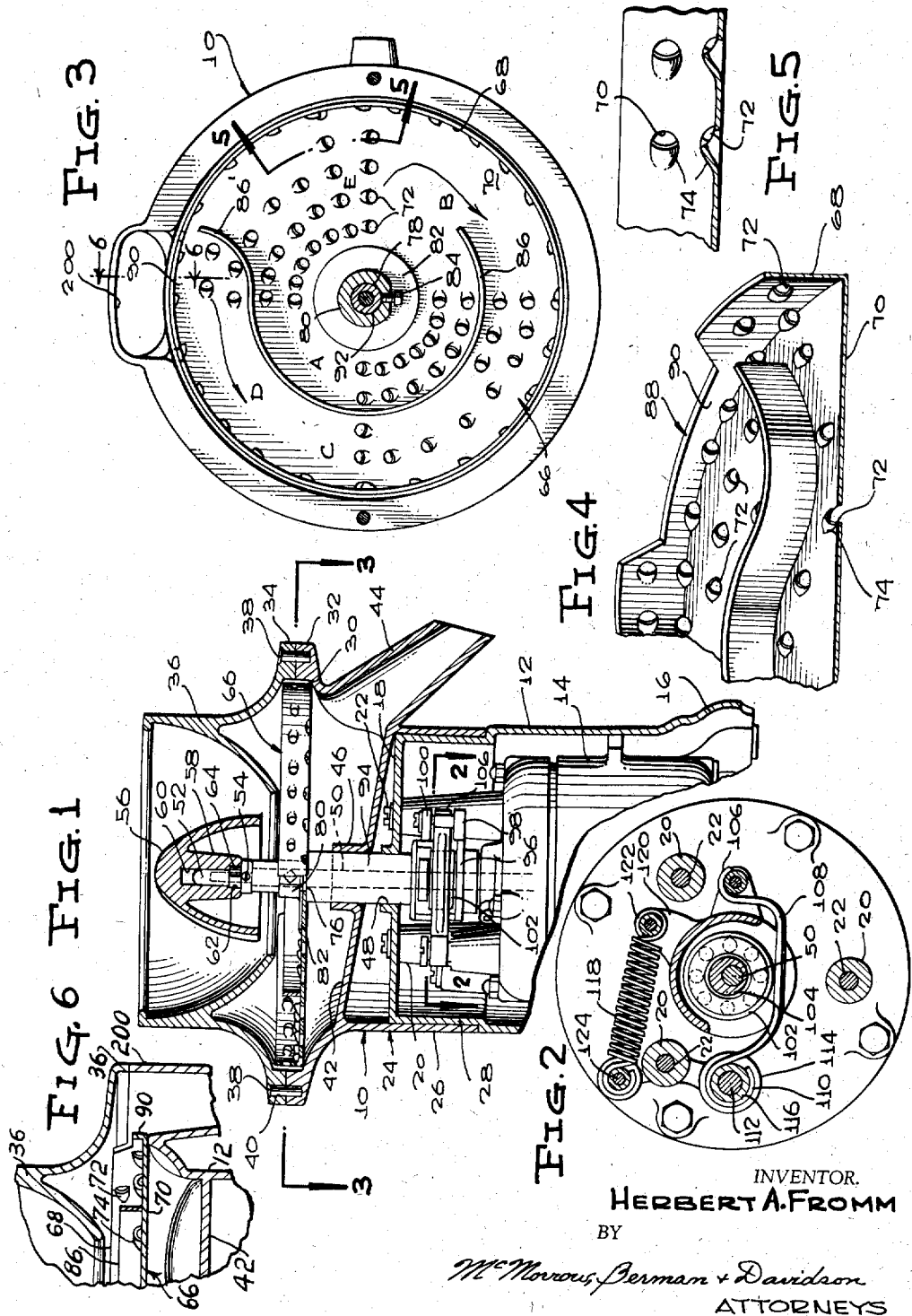

2,920,669
FRUIT JUICE EXTRACTOR
Herbert A. Fromm, Hamburg, Wis.

Application August 23, 1957, Serial No. 679,902

16 Claims. (Cl. 146—3)

This invention relates to improvements in fruit juice extractors and, more specifically, the invention pertains to the provision of an improved strainer for separating fruit juice from the fruit pulp, fibers and seeds.

One of the primary objects of this invention is to provide a fruit juice extractor incorporating improvements over the extractors disclosed in my prior patents, Number 1,894,858, issued on January 17, 1933; Numbers 2,186,671 and 2,186,672, both of which issued on January 9, 1940; and Number 2,249,817, issued on July 22, 1941; particularly, the main object of this invention is to provide new and improved self-cleaning strainer means which may be incorporated satisfactorily and successfully with the extractor devices described and illustrated in either or both Patents Numbers 2,186,671 and 2,186,672.

Another principal object of this invention is to provide a fruit juice extractor having a power operated reamer and an oscillating strainer mounted for oscillation below the reamer and about the axis of the latter, the oscillating strainer comprising a hollow cylindrical member having a flat end wall or floor extending across one end thereof traversed by a plurality of apertures, some of which extend through the corners of the strainer. This is an important feature of the invention, inasmuch as in strainers of this general type, fruit juice has a tendency to collect and flow around the strainer at the corner formed at the junction of the end wall with the flange of the cylindrical member and is discharged with the accumulated pulp, fibers and seeds in the prior art devices.

A further object of this invention is to provide an oscillating strainer of the type referred to above, with baffle means for preventing the extracted debris from being discharged from the strainer until the debris has traveled at least partially around the flat end wall or floor thereof, the baffle means impeding but not completely blocking the normal movement of the debris towards the point of discharge thereof from the strainer.

It is a still further object of this invention to provide, in a strainer described supra, a baffle for impeding the flow of debris across the floor of the strainer, the baffle including means for engaging the debris to effect an acceleration in the discharge thereof from the strainer floor.

Still another object of this invention is to provide an oscillating strainer of the type referred to above, wherein the baffle and accelerating discharge means may be adjusted relative to a discharge gate, whereby the device may be operated with the gate fully open or selectively adjusted to partially close the same. This is of importance, since to obtain the maximum fruit juice extraction, the length of time the pulp should remain on the strainer floor varies not only with respect to the kind of fruit the juice of which is being extracted (for example, oranges, lemons, limes, etc.) but would also vary with respect to the geographical location in which the fruit is harvested, for example, Florida and California oranges will require, normally, different variations of extraction time.

It is still another object of this invention to provide grater-type openings or apertures extending transversely through the floor of the strainer and the above mentioned corner thereof for striking and impacting the pulp repeatedly to insure the maximum extraction of the juice and to move the pulp substantially continuously in a circular path towards the point of discharge.

This invention contemplates, as another object of this invention, the provision of a fruit juice extractor of the type described above, the extractor being non-complex in construction and assembly, inexpensive to manufacture, and durable in use.

Other and further objects and advantages of the present invention will become more evident from a consideration of the following specification when read in the light of the annexed drawing, in which:

Figure 1 is a medial vertical cross-sectional view, partly in elevation, and illustrating a fruit juice extractor constructed in accordance with the teachings of this invention;

Figure 2 is an enlarged detailed, cross-sectional view, illustrating the reamer driving means and the strainer oscillating means, the view being taken substantially on the horizontal plane of line 2—2 of Figure 1, looking in the direction of the arrows;

Figure 3 is a top plan view of the strainer as mounted in the juice extractor, the view being taken substantially on the line 3—3 of Figure 1, looking in the direction of the arrows;

Figure 4 is an enlarged, fragmentary perspective view of the strainer, its baffle and discharge gate;

Figure 5 is an enlarged, fragmentary detailed, cross-sectional view, partly in elevation, this view being taken substantially on the arcuate line of 5—5 of Figure 3, looking in the direction of the arrows; and Figure 6 is a fragmentary cross-sectional view illustrating the association of the discharge spout relative to the gate and other associated elements, Figure 6 being taken substantially on the vertical plane of line 6—6 of Figure 3, looking in the direction of the arrows.

Referring now more specifically to the drawing, reference numeral 10 designates, in general, a fruit juice extracting device constructed in accordance with this invention and utilizing the driving means described and illustrated in my Patent No. 2,249,817. Only such description of the driving means will be set forth below so as to render this invention fully understandable, and for a more comprehensive dissertation as to its details, reference is made to the patents, per se.

The fruit juice extractor 10 includes a base 12 which may be of tubular construction for housing the motor 14. The base 12 may be flared, as at 16, for ornamental and balancing purposes, and its upper end is provided with a plate 18 from which the motor 14 depends. The motor 14 includes three projections 20 which are arranged in abutting relation with the lower face of the plate 18. Each of the extensions or projections 20 is provided with a threaded bore for the reception of a screw 22 passing through the plate 18 and threadedly engaging the bores of the projections 20.

Upon the base 12 is mounted a head 24 which includes a flange 26 fitting snugly about the constricted reach 28 of the base 12. The head 24 is outwardly flared at 30 for increasing its diameter at the upper end and also to provide a flange 32 upon which the flange 34 of a bowl 36 rests for support. To the flange 32 is fixedly connected two pins 38 which have their upper ends loosely receivable within bores 40 in the flange 38. These pins prevent lateral displacement of the bowl 36, but the bowl is easily removable by lifting it upwardly in the clear of the pins.

Within the head 24 is provided an inclined plate 42 for conveying the fruit juices to the outward spout 44.

For a purpose to be described, the plate 42 is shaped to provide an upstanding flange 46.

The motor mounting plate 18 is provided with a central bore 48 coaxially aligned with the flange 46. The drive shaft 50 of the motor 14 extends through the bore 48 and the flange 46, and the upper end thereof is provided with a tip 52 which is either formed integrally with the motor shaft 50 or is attached thereto, as by the setscrew or pin 54.

Reference numeral 56 designates, in general, a reamer having an inwardly located substantially coaxial boss 58 having an axial bore 60 formed therein. As is seen in Figure 1 of the drawing, the outer end of the bore 60 is enlarged and squared at 62 to receive therein a squared portion 64 of the tip 52 therein. Thus, the reamer 56 is placed in driving relation with the motor 14.

Immediately below the reamer 56 is mounted the strainer to which this invention is primarily addressed. The strainer is designated at 66 and is seen to comprise a substantially hollow cylindrical member having a pair of opposed open and closed ends and includes a cylindrical side wall or flange 68 having an end wall or floor 70 integrally formed therewith or fixedly secured thereto at one end thereof. The strainer 66 is provided with a plurality of openings 72 which are distributed throughout the floor at 70 and through the corner formed in the junction of the flange 68 with the floor 70 at radially spaced intervals, as well as through the flange 68. The openings 72 are preferably circular in configuration and are formed in any suitable manner as by stamping so that the material at one side of the opening 72 is struck upwardly as at 74 to form an upwardly extending projection against which juice sacs and debris will be impacted, when the strainer is oscillated in the manner hereinafter described.

The floor 70 is provided with a central opening 76 which is coaxially aligned with the bore 78 formed in a hub 80 having a radial flange 82 fixedly secured, as by welding, to the floor 70. To serve a function to be described, a setscrew 84 is threaded through the hub 80.

An arcuately shaped flange 86 is fixedly secured to the floor 70 by conventional means and has a peripheral arc extending through approximately 270°. The flange 86 is preferably, though not necessarily, concentrically disposed with respect to the hub 80, and terminates at one of its ends in a reversely curved portion 86'. The outer end of the portion 86' is disposed in spaced relation relative to the flange 68, as is the other end portion 86, and adjacent one side of a cutout section or gate 88 extending downwardly from the upper end thereof. The cutout 88 does not extend completely through the flange 68 thereby leaving a threshold portion 90 to prevent premature discharge of the fruit pulp and juice before the extraction process has been fully completed. The bore 78 of the hub 80 receives and is releasably connected by the setscrew 84 to the upper reduced end 92 of a substantially cylindrical bushing 94 which is adapted to surround the motor shaft 50 but which is free of the shaft to permit relative rotation therebetween.

Oscillatory motion is imparted to the strainer 66 through the bushing 94, the mechanism for effecting this movement comprising an enlarged lower section 96 of the bushing 94 having a pair of outwardly or radially extending ears 98 and 100 thereon. The enlargement 96 of the bushing 94 adapts the same for the reception of a roller or ball bearing 102 mounted on an eccentric 104 rigidly secured to the motor shaft 50 so that the rotation of the shaft 50 will cause the eccentric 104 to impart a reciprocatory motion or an eccentric motion to the outer surface of the roller bearing 102. The ears 98 and 100 are spaced one above the other as indicated in Figure 1, providing a space therebetween for the reception of a hook-type end 106 of a lever 108, the opposite end of which is pivoted as at 110 upon a screw 112 received in a boss 114 on the motor frame, a bushing 116 being interposed between the screw 112 and the lever 108, if desired, for the purpose of reducing friction therebetween. The lever 108 extends across the path of movement of roller bearing 102 so that as the roller bearing moves in its reciprocatory or eccentric path the outer hooked end (of the lever) 106 of the lever 108 will be moved through an oscillatory path and will cause the bushing 94 to be moved through an oscillatory path, the degree of which will depend upon the shape of the eccentric 104.

By referring particularly to Figure 2, it will be noted that the lever 108 swings the bushing 94 in a clockwise direction and in order to cause the bushing to be retracted in a counter-clockwise direction, a relatively heavy spring 118 has the one end thereof secured to an outstanding ear 120 on the bushing 94 as indicated at 122, while the opposite end of the spring 118 is secured as by means of a pin or screw 124 to the frame of the motor 114.

It will be noted that the clockwise movement of the strainer 66 will move the projections 74 of the openings 70 against the juice sacs or debris which is in the strainer, while in the reverse movement of the strainer the debris will be forced rearwardly against the projections when the strainer comes to rest in its rearward or counter-clockwise motion as the lever 108 again contacts the bearing 102.

It is important to note that the fruit juices, pulp and fibrous material leaving the reamer 56 fall on that area A of the strainer floor 70 which is substantially embraced by the flange 86. In this area, this material is moved by the projections 74 in a substantially clockwise direction in the manner described above. However, centrifugal force is exerted on this mass of material causing the mixed mass to move outwardly to the open side of the flange 86 in the direction indicated by the arrow B for admixture with a previously extracted mass disposed in the area C between the flanges 68 and 86, some of which is moving in a counter-clockwise direction as indicated by the arrow designated at D. This sets up an area of great turbulence E between the opposed ends of the flange 86 and produces a time delay of the pulp to maintain an effective straining action. However, the greater mass movement is in a clockwise direction toward the reversely curved end portion 86' of the flange 86.

As is illustrated in Figure 3, the cutout or gate 88 is shown as being in its fully open position relative to a waste spout 200 which projects laterally from the upper end of the head 24. In this position, centrifugal force aided by the flange end 86' will kick off or discharge into the spout 200 a maximum amount of pulp and debris which has accumulated above the threshold 90 as the floor 70 turns in its counter-clockwise direction. However, under certain conditions, it is desirable to retard or delay such discharge. To that end, the setscrew 84 is unloosened and the strainer 66 is rotated on the reduced end 92 of the bushing 94 to reduce the effective size of the cutout 88 relative to the spout 200.

The space between the reversely curved end portion 86' of the flange 86 and the adjacent portion of the flange 68 serves as a by-pass for extracted fluids only and not for any of the debris or roughage. The purpose of this space is to permit a small stream of fluid, which forms a film on the metal surface, to continue its clockwise movement. This stream of fluid resists all efforts to be shaken through the openings 72 and has a very persistent clockwise drift. The exact reason for this phenomenon is not known, but the same is very likely related to the cam action which agitates the strainer and has an intermittent motion like the rest of the material. It has been found that without providing for such by-pass, the juice will puddle at the threshold 90 and foul up the cleaned out debris. Under such conditions, the debris, together with the accumulated juice, would be kicked out into the waste spout 200 in the manner described above with consequent loss of economy.

The correct size of the by-pass between the end portion 86' of the flange 86 and the adjacent portion of the flange 68 depends upon the nature of the fruit. However, and by way of example only, it has been found that an opening of 5/16 of an inch will yield about 42 pints of strained juice from a full box of the current California type of Valencia oranges with a waste of only about one ounce.

Undoubtedly, much of the turbulence set up in the area "E" is caused by centrifugal force which moves the material extracted by the reamer 56 into the outer channel area "B," in conjunction with other forces. It is also equally certain that the reverse action of the curved end portion 86' of the flange 86 augments this turbulence by constantly driving back into the incoming stream some of the debris. In the area "E" most of the fluids and edible pieces of pulp pass through the strainer openings 72, and the material which enters the outer channel or area "B" is almost free from edible parts with the exception of a minor quantity of fluid and small pieces of the debris which either cling to the fluid or are entrained therewith. However, under the pounding action of the curved end portion 86', the remaining fluids and the edible parts are freed, so that these also can pass through the openings 72. The kick-back action of the end 86' throws some of the debris across the threshold 90, as explained above, which makes room for the incoming material. It is stressed, at this point, that the opposing forces acting on the debris and other material accumulated on the strainer floor at 70 do not overcome the forward movement or clockwise drift of the debris. The screenings all end up in the waste spout 200.

Having described and illustrated one embodiment of this invention in detail, it is to be understood that the same is offered merely by way of example, and that this invention is to be limited only by the scope of the appended claims.

What is claimed is:

1. A strainer comprising a receptacle having at least one side wall and an end wall extending across and fixedly secured to one end of said side wall, said side and end walls having a plurality of openings extending transversely therethrough and through the corner formed at the junction of said side and end walls, and said side wall having a cutout portion formed therein comprising a gate for the discharge of debris accumulated in said strainer, said cutout portion extending towards said end wall in spaced relation relative thereto to form a threshold.

2. In a power-driven fruit juice extractor having a reamer and an oscillating strainer disposed below said reamer, said strainer comprising a substantially hollow cylindrical member having a pair of opposed open and closed ends, said strainer having a plurality of openings extending transversely through said closed end and through the corner formed at the junction of said cylindrical member with said closed end, and said cylindrical member having a cutout portion formed therein comprising a gate for the discharge of debris accumulated in said strainer, said cutout portion extending through said cylindrical member towards said closed end and terminating in spaced relation relative thereto to form a threshold.

3. In a power-driven fruit juice extractor, as defined in claim 2, wherein said openings extend through said cylindrical member.

4. In a power-driven fruit juice extractor as defined in claim 2, wherein said openings formed in said closed end and said cylindrical member include upwardly extending projections thereof adapted for impaction with the fruit mass removed by said reamer.

5. In a power-driven fruit juice extractor having a reamer and an oscillating strainer disposed therebelow, said strainer comprising a substantially hollow cylindrical member having a pair of opposed open and closed ends and a side wall, said closed end having an arcuate flange projecting laterally therefrom in spaced relation relative to said side wall, said flange having an arcuate length greater than 90° and less than 360°, and said closed end having a plurality of openings extending transversely therethrough.

6. In a power-driven fruit juice extractor having a reamer and an oscillating strainer disposed therebelow, said strainer comprising a substantially circular flat floor having a circumferential first flange projecting laterally from the marginal edge thereof, said first flange having a cutout portion formed therein comprising a gate for the discharge of debris accumulated on said floor, an arcuate second flange fixedly connected with said floor and projecting laterally from a side thereof in laterally spaced relation relative to said first flange, said second flange having an arcuate length of less than 360° and being substantially concentric with respect to said first flange, said second flange having an end thereof terminating adjacent one side of said cutout portion, and said floor having a plurality of openings extending transversely therethrough.

7. In a power-driven fruit juice extractor having a reamer and an oscillating strainer disposed therebelow, said strainer comprising a substantially circular flat floor having a circumferential first flange projecting laterally from the marginal edge thereof, said flange having a cutout portion formed therein comprising a gate for the discharge of debris accumulated on said floor, an arcuate second flange fixedly connected with said floor and projecting laterally from a side thereof in laterally spaced relation relative to said first flange, said second flange having an arcuate length of less than 360° and having an end thereof terminating adjacent one side of said cutout portion, said floor and said first flange having a plurality of openings extending transversely therethrough, said strainer at the junction of said floor with said first flange having a plurality of openings extending transversely therethrough, and said strainer having inwardly extending raised portions immediately adjacent said openings.

8. In a power-driven fruit juice extractor having a reamer and an oscillating strainer disposed therebelow, said strainer comprising a substantially circular flat floor having a circumferential first flange projecting laterally from the marginal edge thereof, said first flange having a cutout portion formed therein comprising a gate for the discharge of debris accumulated on said floor, said cutout portion extending towards said floor in spaced relation relative thereto to form a threshold, an arcuate second flange fixedly connected with said floor and projecting laterally from a side thereof in laterally spaced relation relative to said first flange, said second flange having an arcuate length of less than 360° and having a reversely curved end terminating adjacent one side of said cutout portion in spaced relation to said first flange, and said floor having a plurality of openings extending transversely therethrough.

9. In a fruit juice extractor having power means for driving a fruit juice extracting reamer and an oscillating strainer disposed therebelow, and a casing enclosing said power means, said casing having a debris discharge spout projecting outwardly therefrom, said strainer comprising a substantially circular flat floor having a circumferential first flange projecting laterally from the marginal edge thereof, said first flange having a cutout portion formed therein comprising a gate for the discharge of said debris accumulated on said floor, an arcuate second flange fixedly connected with said floor and projecting laterally from a side thereof in laterally spaced relation relative to said first flange, said second flange having an arcuate length of less than 360° and having an end thereof terminating adjacent one side of said cutout portion, said cutout portion being disposed in juxtaposition with respect to said debris discharge spout, and said floor having a plurality of openings extending transversely therethrough.

10. In a fruit juice extractor including power means for driving a reamer and an oscillating strainer disposed therebelow, and a casing enclosing said power means, said casing having a debris discharge spout projecting outwardly therefrom, said strainer comprising a substantially circular flat floor having a circumferential first flange projecting laterally from the marginal edge thereof, said first flange having a cutout portion formed therein comprising a gate for the discharge of debris accumulated on said floor, an arcuate second flange fixedly connected with said floor and projecting laterally from the side thereof in laterally spaced relation relative to said first flange, said second flange having an arcuate length of less than 360° and having a reversely curved end disposed in spaced relation relative to said first flange, said reversely curved end of said second flange terminating adjacent one side of said cutout portion, means for selectively adjusting the relative positions of said cutout portion and said discharge spout, and said floor having a plurality of openings extending transversely therethrough.

11. In a device of the type defined in claim 10, wherein said first flange and the corner formed at the junction of said floor with the first flange is provided with a plurality of transversely extending openings disposed in radially spaced relationship.

12. In a device of the type described in claim 11, wherein said floor, said corner, and said first flange are all provided with inwardly extending raised portions immediately adjacent said openings.

13. In a power-driven fruit juice extractor having a reamer and an oscillating strainer disposed therebelow, said strainer including a perforated substantially circular floor having a circumferential flange projecting laterally from the marginal edge thereof, and said flange having a cutout portion formed therein comprising a gate for the discharge of debris accumulated on said floor, said cutout portion extending towards said floor in spaced relation relative thereto to form a debris restraining threshold therebetween.

14. A strainer comprising a substantially circular flat floor having a circumferential first flange projecting laterally from the marginal edge thereof, said first flange having a cutout portion formed therein comprising a gate for the discharge of debris accumulated on said floor, said cutout portion extending towards said floor in spaced relation relative thereto to form a threshold, an arcuate second flange fixedly connected with said floor and projecting laterally from a side thereof in laterally spaced relation relative to said first flange, said second flange having an arcuate length of less than 360° and having a reversely curved end, the remotely disposed ends of said second and reversely curved end portion of said second flange terminating in spaced relation relative to said first flange, and said floor having a plurality of openings extending transversely therethrough.

15. A strainer comprising a substantially circular flat floor having a circumferential first flange projecting laterally from the marginal edge thereof, said first flange having a cutout portion formed therein comprising a gate for the discharge of debris accumulated on said floor, said cutout portion extending towards said floor in spaced relation relative thereto to form a threshold, an arcuate second flange fixedly connected with said floor and projecting laterally from a side thereof in laterally spaced, concentric relation relative to said first flange, said second flange having an arcuate length of less than 360°, the remotely disposed ends of said second flange being spaced from said first flange with one of said remotely disposed ends terminating adjacent one side of said cutout portion, and said floor having a plurality of openings extending transversely therethrough.

16. A strainer comprising a substantially circular flat floor having a circumferential first flange projecting laterally from the marginal edge thereof, said first flange having a cutout portion formed therein comprising a gate for the discharge of debris accumulated on said floor, said cutout portion extending towards said floor in spaced relation relative thereto to form a threshold, an arcuate second flange fixedly connected with said floor and projecting laterally from a side thereof in laterally spaced concentric relation relative to said first flange, said second flange having an arcuate length of less than 360° and having a reversely curved end terminating adjacent one side of said cutout portion in spaced relation relative to said first flange, and said floor having a plurality of openings extending transversely therethrough.

References Cited in the file of this patent

UNITED STATES PATENTS

| | | |
|---|---|---|
| 1,757,326 | Miller | May 6, 1930 |
| 2,186,671 | Fromm | Jan. 9, 1940 |
| 2,186,672 | Fromm | Jan. 9, 1940 |
| 2,670,849 | Dunmire | Mar. 2, 1954 |